United States Patent [19]
Huang et al.

[11] 3,966,023
[45] June 29, 1976

[54] NOZZLE CHAMBER FRICTION DAMPER

[75] Inventors: Kuo P. Huang, Broomall; John J. Walsh, III, Newtown Square, both of Pa.

[73] Assignee: Westinghouse Electric Corporation, Pittsburgh, Pa.

[22] Filed: Mar. 21, 1975

[21] Appl. No.: 560,459

[52] U.S. Cl. .................................. 188/1 B; 64/15 R
[51] Int. Cl.² ............................................. F16F 7/08
[58] Field of Search ............... 64/11 R, 15 R, 27 B, 64/27 C, 27 R; 188/1 B; 285/49; 418/157

[56] References Cited
UNITED STATES PATENTS

| 1,893,486 | 1/1933 | Black | 64/27 C |
| 3,589,475 | 6/1971 | Alford | 188/1 B |
| 3,646,777 | 3/1972 | Anderson et al. | 64/15 R X |

FOREIGN PATENTS OR APPLICATIONS

| 949,299 | 2/1964 | United Kingdom | 64/15 R |

*Primary Examiner*—Duane A. Reger
*Attorney, Agent, or Firm*—G. H. Telfer

[57] ABSTRACT

A damping device for limiting motion of nozzle chamber members relative to each other and relative to a casing of a turbine apparatus both in the axial direction and in a transverse plane. The device comprises a friction generating member mounted on a nozzle chamber and disposed in abutting contact with an adjacent nozzle chamber or with the turbine casing. Relative motion between the contacted surfaces of the friction generating member and the surface against which it abuts generates a friction force which limits motion therebetween. The friction generating member is biased by a suitable arrangement disposed in a bore in one of the chambers to maintain contact with the abutting surface. A bias force acting on the friction generating member in a substantially axial direction relative to the bore assists in further maintaining the axial alignment of the members. Friction forces generated within the bias arrangement also combine to impede or limit the displacement of the nozzle chambers relative to each other or relative to the interior of the turbine casing.

16 Claims, 6 Drawing Figures

NOZZLE CHAMBER FRICTION DAMPER

BACKGROUND OF THE INVENTION

1. Field of the Invention:

This invention relates to steam turbine apparatus and in particular to a damping device for limiting motion between adjacent nozzle chambers and between nozzle chambers and the interior of the turbine casing in both the axial direction and in a plane transverse thereto.

2. Description of the Prior Art:

As is known to those skilled in the art of steam power generation, a turbine apparatus comprises a casing having a plurality of annular arrays of stationary blades mounted therein and a rotor member having a corresponding plurality of annular arrays of rotating blades interposed between each array of stationary blades. A motive fluid, commonly steam, is confined and guided within the turbine casing and passes over the stationary and rotating blades to convert the energy of the high temperature, high pressure steam into rotational mechanical energy.

The casing is a substantially cylindrical member cast of suitable material and has disposed circumferentially about the interior thereof a plurality of interlocked nozzle chamber members. The nozzle chamber members form the mounting on which a plurality of nozzle blocks are placed. These nozzle blocks convey steam from the inlet piping extending through the casing and introduce that steam onto the first array of rotating blades mounted on the rotor disposed within the casing.

Each nozzle chamber is itself an arcuate member that is mounted, by a tongue-and-groove fit, on the interior of the turbine casing. Each nozzle chamber is itself engaged with the adjacent nozzle chamber through a similar tongue-and-groove fit.

Recent failures of several on-line turbine units have led to the discovery of excessive fit clearance between the tongue-and-groove fits disposed between adjacent nozzle chambers and between the nozzle chambers and the turbine casing. These tongue-and-groove fits are provided to prevent displacement of the engaged nozzle chambers in the axial direction within the turbine casing and to resist vibration, by frictional engagement, in a plane transverse to the turbine axis. At the same time, however, the tongue-and-groove fit allows thermally-caused relative motion to occur in the transverse plane. As a general rule, the total initial clearance at fitting between each tongue-and-groove fit, whether between adjacent nozzle chambers or between a nozzle chamber and the interior of the casing, is approximately 0.003 inches.

In the course of time and during operation of the apparatus, vibration of the nozzle chamber in both the axial direction and in the transverse plane results in substantial wear of the surfaces of the tongue-and-groove fits. Such wear increases the initial clearance and renders the tongue-and-groove fits ineffective for restricting axial displacement of the nozzle chambers relative to the turbine casing and in damping any vibration of the nozzle chambers.

It is apparent that a damping device which will limit motion of the nozzle chambers in the axial direction relative to the turbine casing and which will limit motion of adjacent nozzle chambers relative to each other in a transverse plane is required.

SUMMARY OF THE INVENTION

This invention discloses a friction damping device for restraining and limiting motion between a nozzle chamber and an adjacent nozzle chamber and between the nozzle chamber and the turbine casing both in the axial direction and in a transverse plane. The damping device comprises a friction generating member biased into abutting contact with the adjacent nozzle chamber, or with the interior of the casing. The friction generating member is biased into position by a plurality of Belleville washers stacked in an appropriate configuration. By maintaining the friction generating member in contact against the abutting surfaces on either the adjacent nozzle chambers or the interior casing a friction force is generated at the contacting interface. This abutting contact limits vibrations and motion in a plane transverse to the axis of the turbine apparatus. Further, the force imposed upon the friction generating members by the Belleville washers maintains the adjacent nozzle chambers in their appropriate axial positions relative to each other and relative to the casing. Still further, friction forces generated within the stack of Belleville washers, which bias the friction generating members, also limit and reduce the magnitude of the axial displacement of the nozzle chambers.

It is an object of this invention to provide a device to continuously damp vibration and motion between adjacent nozzle chamber members relative to each other and relative to the interior of the turbine apparatus in both the axial direction and in a transverse plane. Further objects of the invention will become clear in the description of the preferred embodiment that follows.

BRIEF DESCRIPTION OF THE DRAWINGS

For a consideration of what we believe to be the novel and patentable features of our invention, attention is directed to the following description and the claims appended thereto in connection with the accompanying drawings, in which:

DESCRIPTION OF THE PREFERRED EMBODIMENT

Figure 1:
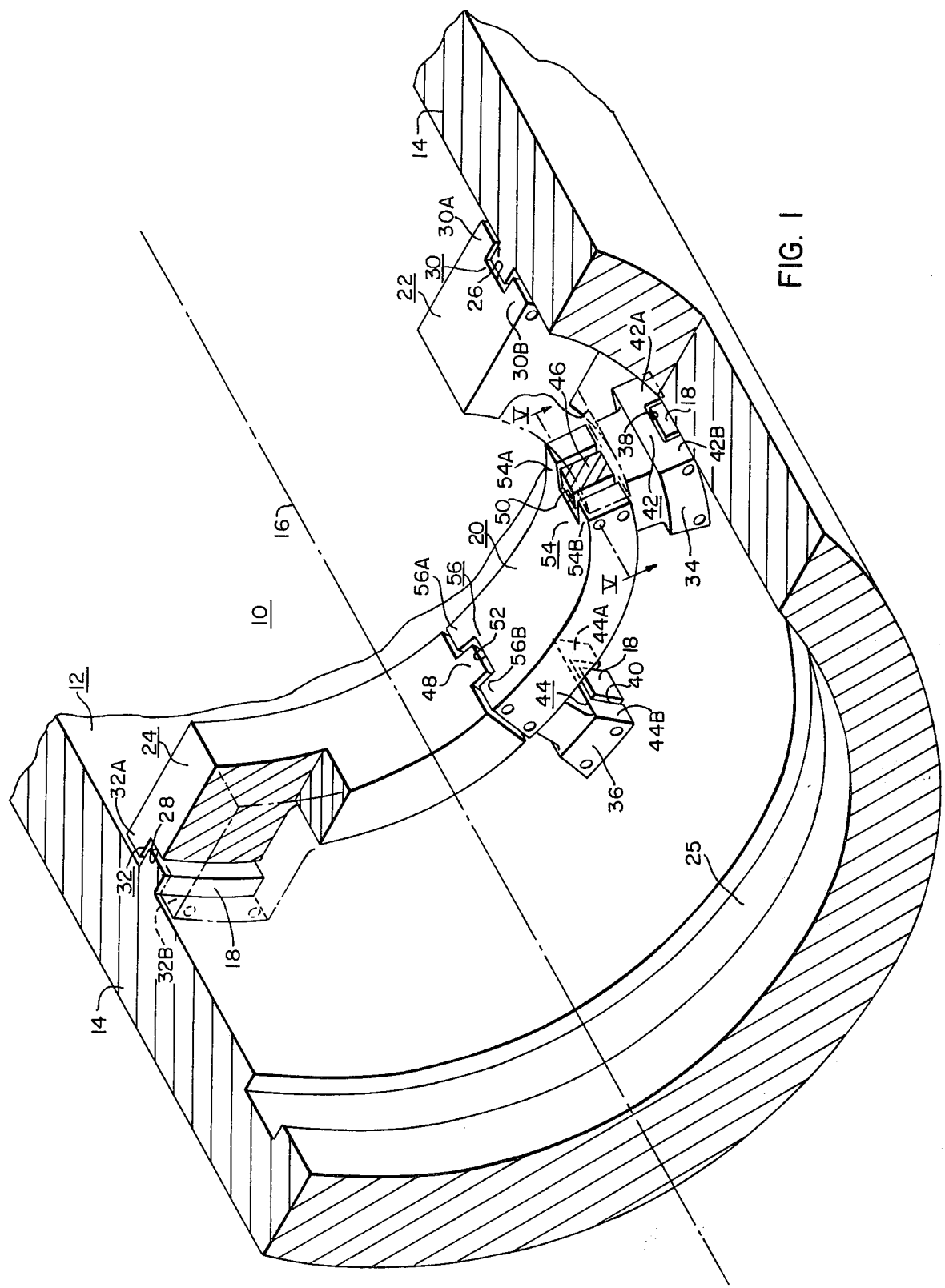
FIG. 1 is a perspective view of the interior of axial flow turbine apparatus showing the preferred environment for a friction damping device embodying the teachings of this invention.

Throughout the following description similar reference numerals refer to similar elements in all figures of the drawings.

Referring first to FIG. 1, a perspective view of the interior of a turbine apparatus 10 showing the general environment for a friction damping device embodying the teachings of the invention is generally indicated.

As is well known, the turbine 10 is assembled by joining and securing the upper and lower halves thereof along a horizontal plane after the constituent elements of the turbine 10 have been disposed in their respective positions within each half. In FIG. 1, what is seen is a perspective view taken while looking in-plan at the lower half of a turbine casing 12. It is to be understood that the following description is not limited, however, to the lower half of the casing of a turbine apparatus. It is to be further understood that when assembly is complete, the lower half 12 is joined along the horizontal plane 14, indicated by cross-hatchings, with a corresponding upper half to form a completed turbine apparatus. In FIG. 1, an axis 16 is shown, the axis 16 being understood to extend centrally and axially through the interior of the completed turbine 10.

Extending circumferentially about portions of the interior of the casing 12 is a ridge-like protuberance, or tongue 18. Mounted on the tongue 18 and extending circumferentially but not continuously about the interior of the casing 12 is an interlocked plurality of nozzle chamber members, numeral 20 indicating the center nozzle chamber, while numerals 22 and 24 indicate the right and left nozzle chambers, respectively.

Each nozzle chamber 20, 22 and 24 is a substantially arcuate member which serves as the mounting platform for a plurality of nozzle blocks (not shown). In the completed turbine, the nozzle blocks transfer motive fluid from inlet piping to the first array of stationary blading (not shown) which is disposed within the turbine casing 12 in annular grooves generally suggested by reference numeral 25.

Both the side nozzle chambers 22 and 24 have a groove 26 and 28, respectively, disposed on their radially outward surfaces. The groove 26 in the right nozzle chamber 22 defines a lug 30 having lands 30A and 30B on each axial side thereof, while, in similar fashion, lug 32 having lands 32A and 32B defined on each axial side of the groove 28 disposed in the left nozzle chamber 24. The grooves 26 and 28 engage the tongue 18 disposed on the interior of the turbine casing 12.

The center nozzle chamber 20 has a first and a second support foot 34 and 36, respectively, mounted on the radially exterior surface thereof. The support feet 34 and 36 are integral with the center nozzle chamber 20 and have grooves 38 and 40, respectively, each of which engages the tongue 18, as shown in FIG. 1. The grooves 38 and 40 each define lugs 42 and 44 respectively, each lug 42 and 44 having lands 42A and 42B and 44A and 44B on the respective axial sides thereof, as shown on the support feet 34 and 36. The engagement of grooves 26, 28, 38 and 40 with the substantially circumferentially extending tongue 18 provides axial alignment of the nozzle chambers 20, 22 and 24 relative to the interior of the turbine casing 12.

As shown in FIG. 1, the side nozzle chambers 22 and 24 have at one arcuate end, tongue members 46 and 48, respectively. The center nozzle chamber 20 has disposed at each of its arcuate ends a first and a second groove 50 and 52, respectively, extending in a substantially radial direction relative to the axial center line 16 of the turbine 10. The grooves 50 and 52 define on the center nozzle chamber 20, lugs 54 and 56, the lugs 54 and 56 defining, respectively, lands 54A and 54B and 56A and 56B. As seen in FIG. 1, the insertion of the tongue 46 into the groove 50, and the tongue 48 into the groove 52 provides an interlocking arrangement so that the separate nozzle chambers 20, 22 and 24 are effectively aligned in a transverse plane of the turbine 10, that is, in a plane perpendicular to the axis 16.

As a general rule, all of the tongue-and-groove fits herein described have an initial clearance of approximately 0.003 inches. Provision of the tongue-and-groove fit, as described, prevents displacement of the interlocked nozzle chambers in a direction along the axis 16 of the turbine 10 and at the same time resists vibration and displacement of the nozzle chambers relative to themselves and to the casing 12 in a plane transverse to the axis 16. However, at the same time, the tongue-and-groove arrangement described accommodates thermally-caused relative motion of the nozzle chambers in the transverse plane. The locking effect of adjacent nozzle chambers permits warping or bending of the nozzle chambers due to differential thermal expansion to occur as a unit.

However, as known to those skilled in the art, vibration and wear of the tongue-and-groove fits at the positions indicated during operation of the turbine apparatus opens the initial clearances and renders the fits ineffective for their proposed function. In order to alleviate this situation, a friction damping device generally shown in FIG. 2, is most advantageously disposed within the lands defined by the lugs 30, 32, 42, 44, 54 and 56.

Figure 2:
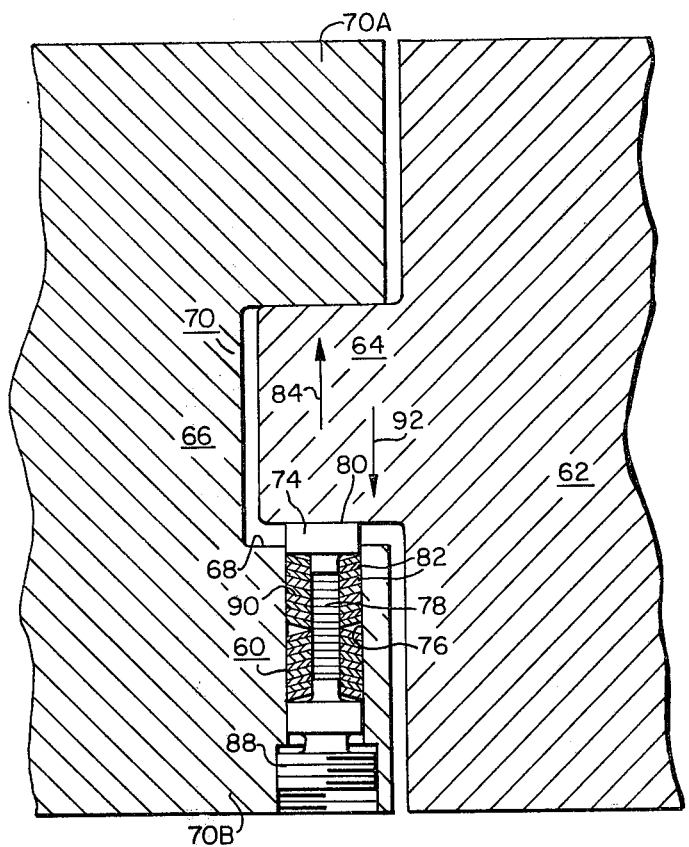
FIG. 2 is an expanded view showing in cross-section a friction damping device embodying the teachings of this invention.

In FIG. 2, an expanded, cross-sectional view of a friction damping device, generally indicated by reference numeral 60 is shown in a typical environment. In FIG. 2, it is to be understood that there is shown a generalized view of any of the possible locations mentioned in FIG. 1 as an appropriate location for utilization of the device 60. However, it is to be understood that a device embodying the teachings of this invention is not limited to the environment of a steam turbine apparatus, but may be utilized wherever there is required the tongue-and-groove mounting of a first member with a second member.

In FIG. 2, the first member is generally indicated by reference numeral 62 and has a protuberance, or tongue, 64 thereon. The second member, generally indicated by reference numeral 66 has a groove 68 disposed therein, the groove 68 defining on each side thereof a lug 70. For convenience, the lug 70 will be demarcated by reference numerals 70A and 70B, indicating the upper and lower lands, as shown in FIG. 2, which define the lug 70. It is also to be understood that the clearances shown between the interlocked members 62 and 66 are greatly exaggerated, for clarity, with the precise engagements of the members defining a clearance therebetween on the order of 0.003 inches.

It may be readily appreciated that the generalized nomenclature used in FIG. 2 is easily applicable to the specialized situation shown in FIG. 1. For example, it may be seen that the first member 62 having the protuberance 64 corresponds to the casing 12 having the tongue 18 thereon. Similarly, FIG. 2 terminology may generally describe the specific situation shown in FIG. 1 where the first member 62 corresponds to the right nozzle chamber 22 and the protuberance 64 corresponds to the tongue 46 shown extending therefrom.

In like manner, the generalized designation in FIG. 2 showing the second member 66 having the groove 68 therein and receiving the protuberance 64 may be aptly applied to any of the several possible sites for locating the device 60 as mentioned in FIG. 1. For example, the second member designation may apply to the left nozzle chamber 24, which has a groove 28 therein receiving the tongue 18. Also, the designation "second member" may be applied to the left support foot 36 disposed integral with the center nozzle chamber 20 and having the groove 40 therein which receives the tongue 18.

In general, the damping device 60 comprises a friction generating member 74 movably disposed in a cavity 76 defined within the second member 66. The device 60 further comprises means 78 for biasing the friction generating member 74 so as to maintain an abutting interface 80 between the friction generating member 74 and the protuberance 64 on the first member 62.

Figure 3:
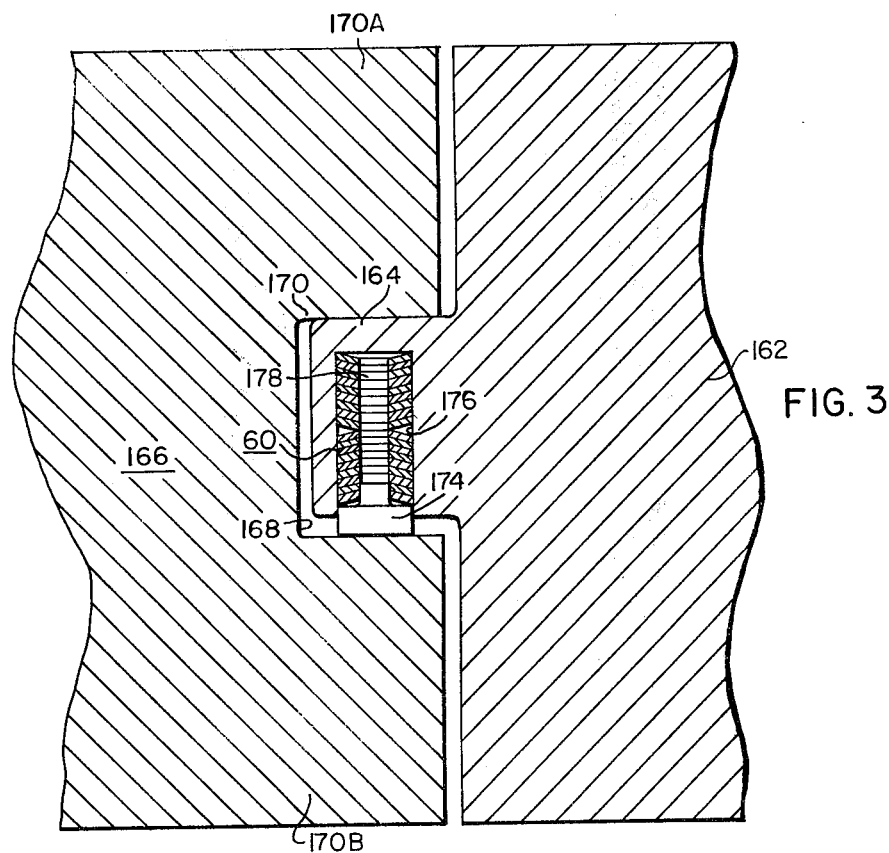
FIG. 3 is a fragmented cross-section view of an alternate embodiment of this invention.

The means 78 may comprise any suitable device which can exert a force of a predetermined magnitude acting in a direction 84 sufficient to maintain the abutting interface 80 between the friction generating member 74 and the first member 62 while requiring only a limited amount of physical space. In practice, it has been found that a plurality of stacked, Belleville washers 82, when overlapped in any appropriate configuration, are able to exert, while occupying a limited physical space, an appropriate bias force acting in the direction 84. It is, of course, understood that any stacked configuration of Belleville washers is appropriate, and no limitation whatever in this regard is intended by the stack shown in FIGS. 2 through 5. The initial compressive force on the stacked Belleville washers are provided by a closure plug 88 threadably secured within the cavity 76, as is seen in FIG. 2. It is to be understood, however, that although there is shown a bore 76 having a closure plug 88 threadedly engaged therein which remains stationary so as to permit the bias force generated within the compressed stack of Belleville washers 82 to be advantageously exerted upon the movably-disposed friction-generating member 74, there may be equally as advantageous the provision of a closed cavity, such as that shown for illustration in FIG. 3. As illustrated in FIG. 3, the essential elements of this device 60 comprise a friction-generating member 174 movably disposed within a cavity 176 (in FIG. 3, the cavity is provided in the protuberance 164 of the member 162) and biased into abutting contact with a groove 168 defining a lug 170 having lands 170A and 170B provided in a second member 166. However, as will become clear hereafter, the provision of a bore 76 as shown in FIG. 2 in which to dispose the movable friction-generating member 74 and the bias means 78 offers considerable installation advantages when utilizing the device in the environment of a steam turbine apparatus.

The friction-generating member 74 is any suitably shaped member, shown as a cylindrical shape in FIG. 2, disposed for movement within the bore or cavity 76. The member 74 may be fabricated of any wear-resistant material, such as 12% chromium stainless steel, and most advantageously the abutting surface on the protuberance 64 which defines the friction interface 80 is also suitably clad with a layer of harder material such as stellite, or a suitably surface-hardened material. If wear along the abrading surfaces does occur, the bias means 78 displaces the friction-generating member 74 to insure that the abutting contact, and therefore the friction-generating interface 80 is maintained.

Figure 4A:
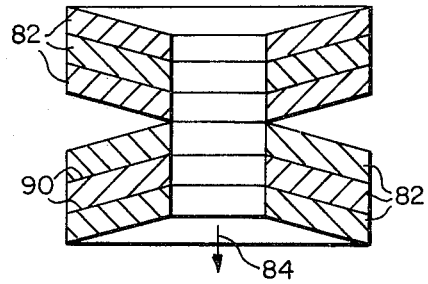
FIGS. 4A and 4B are isolated views of a stacked plurality of Belleville washers utilized in this invention, and, FIG. 5 is a view taken along lines V—V of FIG. 1, showing the device in preferred disposition within a turbine apparatus.
Figure 4B:
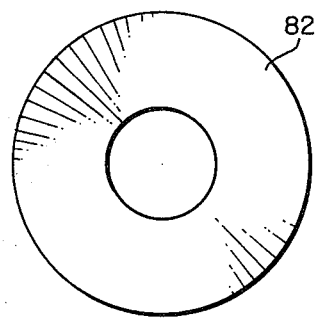

As stated earlier, the bias means 78 is most advantageously a stacked plurality of overlapped Belleville washers 82, as best seen in FIG. 4. In FIG. 4A, it is seen that each of the individual washers 82 are stacked in a series-parallel configuration, with each of the washers 82 being most appropriately fabricated of a high-temperature heat resistant alloy, such as sold by the assignee of this invention under the Tradename "Refractaloy 26", which is ideally suited for the high temperature steam turbine environment for which this invention is most preferred. FIG. 4B illustrates a plan view of an individual washer 82.

The stack of Belleville washers 82 is especially useful to generate a bias force since a relatively powerful force acting in direction 84, that is along the axis of the stack can be generated thereby and acting in a direction of the axis of the stack while the stack physically occupies a relatively small space. The stack of washers 82 responds to a compressive force thereon by exerting a force acting in the direction 84 along the axis of the stack 82. In the preferred embodiment of FIG. 2, the compressive force is generated by the abutment of the stack of washers 82 with the closure plug 88.

As seen in FIG. 4, the stacked washers 82 have an overlapped surface area 90 between each adjacent washer 82. As described hereafter, the overlapped surfaces 90 generate a useful friction force to resist displacement of the friction-generating member 74, and therefore of the protuberance 64 against which it abuts, in a direction which is parallel to the axis of the stack.

Referring again to FIG. 2, by threadedly engaging the closure plug 88, or by any other suitable arrangement such as that in FIG. 3, the exertion of a compressive force on the stacked plurality of Belleville washers 82 results in a bias force 84, acting in the direction of the axis of the stack 82, being exerted upon the movably disposed friction-generating member 74. The member 74 responds to the bias force acting thereon by firmly abutting and maintaining the friction generating interface 80 between the friction generating member 74 and the protuberance 64 on the first member 62.

It may be readily appreciated that by maintaining the friction interface 80, any motion between the protuberance 64 and the friction generating member 74 in a plane transverse to the direction of the force 84, (that is, any relative motion therebetween which occurs in a plane perpendicular to the direction of the bias force) 84 generates a friction force along the interface 80 to dampen and dissipate the vibrational energy. Thus, relative motion between the first member 62 and the second member 66 will be effectively damped. The abutment 80 is continually maintained, due to the bias 84.

From the foregoing, it may be seen that an effective friction damper is provided to dissipate vibratory energies which may be generated between the mated first member 62 and the second member 66 due to relative motion therebetween occurring in a plane transverse to the direction 84 of the bias force. Also, it may be understood that the abutment of the friction-generating member 74 and the protuberance 64 prevents relative motion between the members 62 and 66 in a direction contained within the plane of the page. The bias force 84, in addition to maintaining the friction-generating interface 80 between the friction-generating member 74 and the protuberance 64, inhibits any relative motion between the members 62 and 66 which opposes the bias force 84. Thus, if a force is exerted on the first member 62 tending to displace that member in a direction 92, it is seen that such motion is opposed to, and effectively resisted by, the force 84 of the bias arrangement 78.

The provision of the overlapped Bellevile washers 78 also assist resisting motion in the direction 92 to maintain alignment between the members 62 and 66. Since the overlapped surface area 90 (FIG. 4A) is disposed between each washer 82, it is seen that any force tending to displace the member 74 in the direction 92 (FIG. 2) generates a friction force along the overlapped surface area 90, (FIGS. 2 and 4A), a component of which tends to resist motion in the direction 92. Thus, the friction force generated within the stack of washers 82 along their overlapped surfaces 90, in addition to the bias force 84 generated by the bias arrangement 78 as a whole tends to oppose motion of the members 62 and 66 in the direction 92.

To recapitulate, then, it is seen that the device 60 embodying the teachings of this invention prevents motion between the first member 62 and the second member 66 which displaces either member in a direction acting opposed to the bias force 84.

Figure 5:
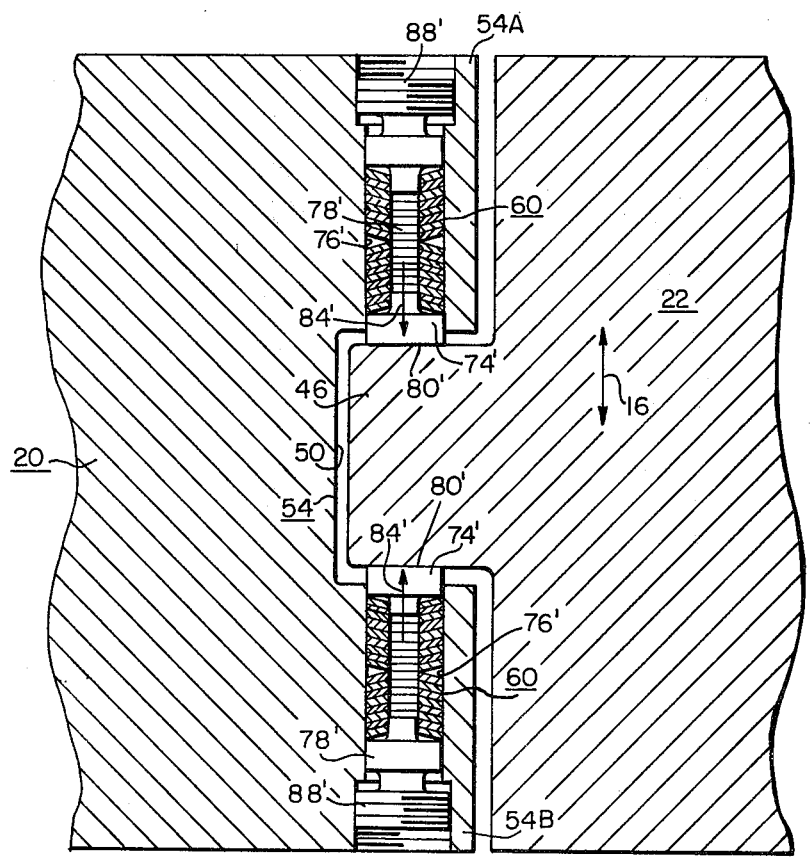

After describing the fabrication and operation of the device 60 in a generalized manner, reference is directed to FIG. 5, which is a view taken along lines V—V in FIG. 1, showing a device embodying the teachings of the invention disposed in its preferred environment of a steam turbine apparatus. It is to be understood that the view shown in FIG. 5 illustrates only one of several possible locations wherein the device 60 may be advantageously utilized, and that the listing of such possible locations mentioned earlier is illustrative and not exhaustive.

In FIG. 5, the tongue 46 on the right nozzle chamber 22 is shown as engaged within the groove 50 disposed within the center nozzle chamber 20. As stated earlier, relative motion in a transverse plane relative to the axis 16 of the turbine apparatus 10 may enlarge the original close fit between the interlocked nozzle chambers 20 and 22. To rectify the situation, a device 60 embodying the teachings of this invention is disposed on each axial side of the tongue 46.

To facilitate insertion of the devices 60, a bore 76' is disposed through each of the lands 54A and 54B which define the lug 54 (FIG. 1). Friction generating members 74' are provided and movably disposed within the bores 76'. Bias means 78' are provided and a compressive force provided for each by the threaded engagement of closure plugs 88'. As seen in FIG. 5 the bias means 78' exert bias forces on the friction-generating members, the bias forces acting in directions 84', which maintain an abutting interface 80' at each axial side of the tongue 46.

It may be readily appreciated that in a manner similar to that generally described in relation to FIGS. 2–4, the abutment between the friction generating members 74' and the tongue 46 prevents motion between the nozzle chamber 20 and 22 in a plane transverse to the axis 16 of the turbine 10. Also, it may be appreciated that due to the axially inward acting forces 84' and due to the friction forces generated by washer overlap (FIG. 4), motion along the axis 16 between the nozzle chambers 20 and 22 is also effectively prevented.

In addition, due to the disposition of the bores 76' in the lands 54A and 54B, the device 60 is easily and expeditiously installed within the nozzle chamber 20. It is also seen that the degree of compression imparted by the closure plugs 88' is easily controllable since the plugs 88' are accessible from each axial side of the nozzle chamber 20.

By providing a device 60 embodying the teachings of this invention vibratory forces causing relative motion between the engaged nozzle chambers or between a nozzle chamber and the turbine casing may be effectively damped. In addition, axial deflections of the members relative to each other are also inhibited. The device 60 is simple to fabricate, easy to install, and may be expeditiously disposed at any number of locations within a turbine apparatus to dampen motion and maintain alignment between two mutually engaged members.

We claim as our invention:

1. Apparatus for dampening motion between a first member having a protrusion thereon and a second member having a groove therein to receive said protrusion, said apparatus comprising:
    a bore disposed in said second member, said bore having a ledge disposed therein;
    a friction generating member movably disposed within said bore; and,
    means for biasing said friction generating member into an abutting interface with said protrusion on said first member as said protrusion is received within said groove in said second member, said bias means acting on said friction generating member to cause a portion thereof to extend from said bore to establish said abutting interface, said bias means being disposed within said bore and maintained in a biasing relationship with said friction generating member by abutting against said ledge so that relative motion between said first member and said second member generates a friction force along said abutting interface to dampen the relative motion therebetween.

2. The device of claim 1 wherein said bias means comprises a plurality of stacked Bellevile springs.

3. The device of claim 1 wherein a friction generating member is disposed in a bore provided in said second member on each side of said groove therein and abuts against said protrusion on two surfaces thereof when said protrusion is received within said groove,
    bias means for biasing said friction generating members to maintain said abutments being provided within each of said bores, said bias means comprising a plurality of stacked Belleville springs.

4. The device of claim 2 wherein said abutting interface generates a friction force acting in a plane transverse to an axis extending through said bore to limit vibration and motion between said protrusion and said second member in said transverse plane.

5. The device of claim 4 wherein motion between said first and second members in a direction along said axis extending through said bore is limited by the force imposed upon said friction generating member by said bias means, said bias force acting along said axis in opposition to said motion; and,
    said motion is further limited by a force generated between said stacked Belleville springs disposed within said bore, said force acting along said axis in opposition to said motion.

6. The device of claim 3 wherein the abutment between said first and said second friction generating members and said protrusion generates friction force therebetween acting in a plane transverse to an axis extending through said bore to limit motion between said protrusion and said second member in said transverse plane.

7. The device of claim 6 wherein motion between said first and second members in a direction along said axis extending through said bore is limited by the force imposed upon said friction generating members by said bias means, said motion being further limited by a force generated between said stacked Belleville springs disposed within said bores, said forces acting along said axis of said bore.

8. An axial flow turbine apparatus including a rotating element, a casing surrounding said rotating element, said casing having a first member having a protrusion thereon and a second member having a groove therein for receiving said protrusion on said first member, and, means for dampening motion between said first member and said second member, said means comprising:

a bore disposed in said second member, said bore having a ledge disposed therein;

a friction generating member movably disposed within said bore; and, means for biasing said friction generating member into an abutting interface with said protrusion on said first member as said protrusion is received within said groove in said second member, said bias means acting on said friction generating member to cause a portion thereof to extend from said bore to establish said abutting interface, said bias means being disposed within said bore and maintained in a biasing relationship with said friction generating member by abutting against said ledge so that relative motion between said first member and said second member generates a friction force along said abutting interface to dampen the relative motion between said first and said second member.

9. The turbine of claim 8 wherein said bias means comprise a plurality a of stacked Belleville springs.

10. The turbine of claim 8 wherein a friction generating member is disposed in a bore provided in said second member on each side of said groove therein and abuts against said protrusion on two surfaces thereof when said protrusion is received within said groove, bias means for biasing said friction generating members to maintain said abutments being provided within each of said bores, said bias means comprising a pluraliy of stacked Belleville springs.

11. The turbine of claim 9 wherein said abutting interface generates a friction force acting in a plane transverse to an axis extending through said bore to limit vibration and motion between said protrusion and said second member in said transverse plane.

12. The turbine of claim 11 wherein motion between said first and second members in a direction along said axis extending through said bore is limited by the force imposed upon said friction generating member by said bias means, said bias force acting along said axis in opposition to said motion; and, said motion is further limited by a force generated between said stacked Belleville springs disposed within said bore, said force acting along said axis in opposition to said motion.

13. The turbine of claim 10 wherein the abutment between said first and said second friction generating members and said protrusion generates friction force therebetween acting in a plane transverse to an axis extending through said bore to limit motion between said protrusion and said second member in said transverse plane.

14. The turbine of claim 13 wherein motion between said first and second members in a direction along said axis extending through said bore is limited by the force imposed upon said friction generating members by said bias means, said motion being further limited by a force generated between said stacked Belleville springs disposed within said bores, said forces acting along said axis of said bore.

15. The turbine of claim 14, wherein said first member comprises a first nozzle chamber and said second member comprises a second nozzle chamber.

16. The turbine of claim 14, wherein said first member having said protrusion thereon is integral with said casing and wherein said second member comprises a nozzle chamber.

* * * * *